United States Patent Office 3,793,319
Patented Feb. 19, 1974

3,793,319
MANUFACTURE OF 1,1'-DISUBSTITUTED-4,4'-BIPYRIDYLIUM SALTS
John Gerard Carey and John Reginald Case, Runcorn, England, assignors to Imperial Chemical Industries Limited, London, England
No Drawing. Filed Oct. 8, 1970, Ser. No. 79,356
Claims priority, application Great Britain, Oct. 21, 1969, 51,557/69
Int. Cl. C07d 31/22, 31/44
U.S. Cl. 260—246 B          14 Claims

ABSTRACT OF THE DISCLOSURE

A process for the manufacture of a 1,1'-disubstituted-4,4'-bipyridylium salt which comprises reacting an N-substituted pyridinium salt having a —COOH group in the 4-position or a salt derivative thereof with cyanide ions and subsequently oxidizing the resulting interaction product.

---

This invention relates to the manufacture of 1,1'-disubstituted-4,4'-bipyridylium salts which are useful herbicides.

According to the present invention we provide a process for the manufacture of a 1,1'-disubstituted-4,4'-bipyridylium salt which comprises reacting an N-substituted pyridinium salt having a —COOH group in the 4-position or a salt derivative thereof with cyanide ions and subsequently oxidizing the resulting interaction product.

By the expression "salt derivative thereof" we mean the N-substituted pyridinium derivatives in which the 4-carboxy group has been converted to a salt form and we include betaines.

The N-substituted pyridinium salts in which the —COOH group is in the 4-position may be described as N-substituted isonicotinic acid salts and are believed to have the formula:

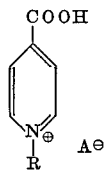

(I)

wherein $A^\ominus$ is an anion. The salt derivatives thereof may be described as N-substituted isonicotinates and are believed to be internal salts or betaines of the formula:

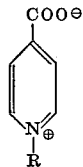

(II)

not associated with a separate anion or cation.

The reaction can be carried out by mixing the reagents and heating the mixture, if necessary, but we prefer to carry out the reaction in a solvent for the N-substituted pyridinium salt. Polar aprotic solvents, especially dimethyl formamide or dimethyl sulphoxide, are particularly suitable solvent.

The temperature at which the reaction is carried out is not critical although in some cases it is greatly advantageous to heat the reaction mixture. In general the reaction may be carried out at a temperature from 25° C. to 120° C., preferably from 40° C. to 90° C. temperatures above 150° C. should in general be avoided. Usually the reaction will be carried out under an inert atmosphere since the interaction product is unstable when exposed to oxygen or air.

The reaction is usually carried out under basic conditions, which may be achieved for example by the presence of an added base.

Any source of cyanide ions may be employed and examples of suitable reagents are cyanides (especially alkali metal cyanides), hydrogen cyanide or complexes of hydrogen cyanide with organic ketones such as acetone. Good results have been obtained using sodium cyanide.

The amount of cyanide ions is determined to some extent by whether the starting material is an N-substituted pyridinium salt with the —COOH group in the 4-position or whether it is a salt derivative thereof. If a salt derivative is used, the reaction is catalytic and requires only a small amount of cyanide ions. If the N-substituted pyridinium salt with the —COOH group in the 4-position is used, we prefer to use an excess of cyanide ions, although the amount of cyanide ions is not critical. Preferably at least 1.0 mole of cyanide is used per mole of the pyridinium salt. The concentration of the pyridinium salt in cases where it is employed in the form of a solution will depend upon the solvent used, and the optimum concentration in each case can be determined by simple experiment. In general, however, concentrations of from 0.1 to 2.0 moles per liter and especially about 0.5 mole per liter are suitable. By way of example, the optimum concentration of 4-substituted N-methyl pyridinium ion in anhydrous dimethyl sulphoxide is about 0.5 mole per liter.

The N-substituted pyridinium salt having a —COOH group in the 4-position or salt derivative thereof may have any suitable N-substituent. Particularly suitable salts are those having an alkyl or a carbamoylalkyl substituent on the nitrogen atom of the pyridine nucleus. The carbamoylalkyl substituent has the formula

wherein $R_1$ is a hydrocarbon radical (especially the methylene radical) and $R_2$ and $R_3$ are hydrocarbon or substituted hydrocarbon radicals (especially alkyl groups of 1 to 6 carbon atoms) and $R_2$ and $R_3$ may, together with the attached nitrogen atom, make up an optionally substituted heterocyclic ring, particularly a piperidine ring or a morpholine ring. If a separate anion is associated with the pyridinium salt, it is conveniently a halide and especially a chloride ion, though the anionic species is not critical and other salts, for example methosulphates, may be used if desired. The pyridine nucleus of the N-substituted pyridinium salt may be substituted, for example by one or more alkyl groups, in the 2, 3, 5 and 6 positions. In the case of an N-alkyl pyridinium salt the alkyl group preferably contains from 1 to 6 carbon atoms. Particularly suitable pyridinium salts are those wherein the N-substituent is a methyl or a carbamoylmethyl (—CH$_2$CONR$_2$R$_3$) group.

The interaction product derived from the N-substituted pyridinium salt and the cyanide is the corresponding 1,1'-disubstituted-1,1' - dihydro - 4,4' - bipyridyl which is readily oxidized to the corresponding 1,1'-disubstituted-4,4'-bipyridylium salt by treatment with an oxidizing agent which is an electron acceptor and has a redox potential in water more positive than —0.50 volt as compared with the saturated calomel electrode. Examples of suitable oxidizing agents are ceric sulphate (in dilute sulphuric acid); metal salts, especially the halides; inorganic oxyacid anhydrides, for example sulphur dioxide; chlorine; oxygen or air, preferably in conjunction with water and/or carbon dioxide and/or an acid for example acetic acid or sulphuric acid; and organic oxidizing agents for example quinones such as benzoquinone, chloranil and anthraquinone. The oxidation is advantageously carried out under acidic conditions, the apparent pH of the reaction mixture being preferably less than 6, especially from 4 to 6. Addition of the oxidizing agent in an acidic medium is usually sufficient to achieve this result.

Sulphur dioxide may be employed as the oxidizing agent in the form of an aqueous solution or alternatively sulphur dioxide gas can be bubbled directly into the reaction mixture. In the latter case and when a non-aqueous reaction medium is employed, the bipyridylium salt precipitates out, thus enabling it to be readily separated from the mixture.

The intermediate dihydrobipyridyl reaction product is usually in the form of a solution in the reaction medium (if a solvent is employed) and it can be oxidized directly without isolation from the mixture in which it has been prepared. However, if this product is oxidized directly the final bipyridylium salt is impure and requires to be purified. In particular the bipyridylium salt so obtained contains free cyanide ions, and these anions may react with the bipyridylium cation so reducing the overall yield of this cation. Methods for separating the bipyridylium cation from free cyanide ions (and other anions) are described hereinafter.

It is usually more convenient to isolate the intermedaite reaction product prior to oxidizing it so that oxidation yields a fairly pure bipyridylium salt substantially free from cyanide. We have found that a useful technique for isolating the intermediate reaction product is to add water, an organic acid (notably acetic acid) or a base (anhydrous or an aqueous solution of the base) to the reaction mixture. This addition results in a slurry and the temperature of the treatment can be from 0° C. to 100° C., preferably from 20° C. to 50° C.

The solid can be isolated by filtration or, preferably, by solvent extraction. Suitable solvents for the extraction are hydrocarbons, particularly aromatic hydrocarbons and notably toluene. The temperature can be from 0° C. to 100°C. After removal of the solid there remains a portion of the intermediate reaction product in the liquid phase; this can be recovered either by oxidizing it to the bipyridylium salt and isolating this salt as hereinafter described or by reducing it to form a further amount of a solid (believed to be a dihydrobipyridyl) which can be isolated as described above prior to oxidizing it. The reduction can be effected by any conventional reduction technique, for example using an alkali metal amalgam or a dithionite.

As hereinbefore explained it may be necessary to separate the final bipyridylium salt from anions, especially from free cyanide ions, in the reaction mixture, for example if the intermediate reaction product is oxidized without first isolating it from the reaction mixture. We have found that 1,1'-disubstituted-4,4'-bipyridylium cations can be separated from anions, notably from cyanide ions, by treating the mixture with 4,4'-diamino-stilbene-2,2'-disulphonic acid (which is commonly known as "amsonic acid"). The bipyridylium cation is thereby precipitated from the mixture in the form of its amsonate salt whilst the anions remain in the mixture. The precipitate can then be removed by filtration, washed and dried in conventional manner and the amsonic acid can be regenerated and recovered for re-use by acidification of the amsonate salt, preferably employing an aqueous solution of an acid. The acid used to recover the amsonic acid can be selected so as to provide the desired anion for the resulting bipyridylium salt and can be for example hydrochloric acid, phosphoric acid, sulphuric acid or acetic acid.

Amsonic acid is only sparingly soluble in water and it is therefore usually employed in the present invention in the form of an aqueous solution of one of its water-soluble salts, conveniently an alkali metal salt or the ammonium salt. The treatment of the reaction mixture with amsonic acid can be conveniently at a pH in the range 7 to 12, and at a temperature of from 0° C. to 100° C.

The 1,1'-disubstituted-4,4'-bipyridylium cation can also be separated from cyanide ions by contacting the mixture with a suitable cation-exchange resin. In this way the cyanide ions pass the resin and remain in the mixture so that they are separated from the bipyridylium cation. The bipyridylium cation can subsequently be liberated from the ion-exchange resin by treatment of the resin with an acid. In this way a bipyridylium salt is obtained wherein the anion is that supplied by the acid. Examples of the anions which may be introduced into the mixture in this way are chloride, sulphate and acetate ions.

Alternatively, cyanide ions can be removed from the bipyridylium cations using an anion-exchange resin.

The temperature at which the mixture is contacted with the ion-exchange resin is not critical but can conveniently be from 0° C. to 100° C. Examples of suitable cation-exchange resins are the Zeocarb cation exchange resins, for example Zeocarb 225 (SRC-8), the Amberlite cation exchange resins for example Amberlite Resin C6–120, and the Deacidite resins. An examples of an anion exchange resin which can be used is Amberlite IRA 400.

A further method of removing cyanide ions from the reaction mixture containing the 1,1'-disubstituted - 4,4'-bipyridylium salt is to acidify and then de-gas the reaction mixture. In this way the cyanide ions are removed from the mixture in the form of hydrogen cyanide and the process is particularly convenient since the hydrogen cyanide so liberated can be reacted directly with a base, for example sodium hydroxide, to form a cyanide which can be used to prepared a further quantity of the bipyridylium cation. Any mineral or organic acid can be used which results in the formation of hydrogen cyanide and examples of suitable acids are hydrochloric, sulphuric, phosphoric and acetic acids. Alternatively the solution can be acidified by means of sulphur dioxide. The acid used can be selected to provide the required anionic species in the final 1,1'-disubstituted-4,4'-bipyridylium salt.

Acidification of the reaction mixture can be effected at any temperature at which the bipyridylium cation is stable, for example from 0° C. to 100° C. The mixture can be de-gassed in conventional manner, for instance by bubbling air or an inert gas through it under vacuum or by boiling the mixture. It will be appreciated that this technique of acidification followed by de-gassing of the mixture is simple to carry out and can be employed to remove from the mixture any anion which forms with a proton a volatile product which can be removed from the mixture by de-gassing. Not only cyanide ions, but also halide ions, especially fluoride and chloride ions, can be removed by the technique.

Cyanide anions can also be in effect removed from mixtures containing 1,1'-disubstituted - 4,4' - bipyridylium cations by addition to the mixture at a temperature of from 0° C. to 100° C. of a reagent which forms a complex salt with the cyanide ions. For example the addition of ferric or ferrous ions in the form of a salt for example a sulphate or halide salt results in the formation of a ferrocyanide. In this case the cyanide ions are not actually removed from the reaction mixture but they are effectively prevented from reacting with the bipyridylium salt by virtue of their being in the form of a complex salt with the added cations.

The invention is illustrated but in no way limited by the following examples.

EXAMPLE 1

N-methyl-4-carboxy - pyridinium methosulphate (0.01 m.—2.49 g.) was added to a stirred suspension of sodium cyanide (0.03 m.) in anhydrous dimethyl sulphoxide (50 ml.) under an atmosphere of nitrogen. The liquid phase immediately became yellow/green in color. The mixture was stirred continuously and was heated to 70° C. during which it became red/brown in color. Heating was continued for 2½ hours (stirring throughout) after which time the mixture was cooled to room temperature and then poured into an aqueous solution of sulphur dioxide. Sodium dithionite was added to the resulting aqueous solution to reduce any bipyridylium radical ion and the solution was then analyzed spectrophotometrically. The solution was found to contain 0.480 g. of N,N'-dimethyl-4,4'-bipyridylium ion, representing a reaction efficiency of 52% based on pyridinium salt fed.

EXAMPLE 2

The procedure of Example 1 was repeated except that, instead of pouring the cooled mixture into an aqueous solution of sulphur dioxide, sulphur dioxide gas was bubbled through the mixture so precipitating the product which was filtered off and dissolved in water. The aqueous solution was analyzed as described in Example 1. The reaction efficiency was again 52% based on pyridinium salt fed.

EXAMPLE 3

The procedure of Example 1 was repeated until the reaction mixture was cooled after being heated at 70° C. for 2½ hours. The mixture was analyzed spectrophotometrically and absorption bands were recorded at 400 m$\mu$ and 374 m$\mu$. These absorptions are characteristic of N,N'-dimethyl-dihydro-4,4'-bipyridyl. The mixture was exposed to air and was then again analyzed spectrophotometrically (after reduction with dithionite) upon which an absorption band was recorded at 600 m$\mu$. This absorption is characteristic of N,N'-dimethyl-4,4'-bipyridylium radical ion.

EXAMPLE 4

1.27 g. of N-methyl pyridinium-4-carboxylate was added to a stirred solution of sodium cyanide (1.47 g.— 0.03 m.) in dimethyl sulphoxide (30 ml.) at 80° C., under an atmosphere of nitrogen gas. The solution became dark brown in color and a sample of this solution was withdrawn and examined by ultra-violet spectroscopy. Absorption bands were obtained at 374 and 400 m$\mu$ showing the presence of 1,1'-dimethyl-1,1'-dihydro-4,4'-bipyridyl.

The dark brown solution was maintained at 80° C. for 2½ hours after which time it was cooled to room temperature. An queous solution of sulphur dioxide was then added. The resulting solution was reduced with sodium dithionite at pH 9, analyzed by polarographic and spectrophotometric analysis and was found to contain the 1,1'-dimethyl-4,4'-bipyridylium cation (0.352 g.) corresponding to a yield of 41% based on N-methyl isonicotinate fed.

EXAMPLE 5

Anhydrous sodium cyanide (0.03 g.) was added to a stirred slurry of N-methyl pyridinium-4-carboxylate (N-methyl isonicotinate) in dimethyl sulphoxide (25 ml.) under an atomsphere of nitrogen gas. The solution turned brown. The mixture was maintained at 80° C. to 90° C. for 3 hours after which it was cooled to room temperature. During the first hour the undissolved isonicotinate gradually dissolved in the mixture.

The cooled mixture was treated with an aqueous solution of sulphur dioxide, treated with dithionate at pH 9, and analyzed as in Example 4.

The analysis showed the presence of 1,1'-dimethyl-4,4'-bipyridium ion (0.63 g.) representing a reaction efficiency of 96% based on N-methyl isonicotinate fed.

EXAMPLE 6

The procedure of Example 5 was repeated but using dimethyl formamide instead of dimethyl sulphoxide. The reaction efficiency was 86% based on N-methyl isonicotinate fed.

EXAMPLE 7

N-dimethylcarbamoylmethyl-4-carboxy-pyridinium chloride (1.22 g.) was treated with sodium cyanide (0.74 g.) in dimethylformamide (30 ml.) for 2½ hours at 75° C. to 85° C. under an atmosphere of nitrogen. The solution was cooled to room temperature and an aqueous solution of sulphur dioxide added. Analysis of the resulting solution by polarography and by spectrophotometric determination of the radical ion formed on reduction with sodium dithionite at pH 9 showed the presence of an amount of the bipyridylium ion corresponding to a reaction efficiency of 24.5% based on the pyridinium salt fed.

EXAMPLE 8

N-dimethylcarbamoylmethyl pyridinium-4-carboxylate ($5 \times 10^{-3}$ m.—1.04 g.) was treated with sodium cyanide (0.49 g.) in dimethylformamide (30 ml.) for 2½ hours at 85° C. to 95° C. under an atmosphere of nitrogen. The solution was cooled to room temperature and an aqueous solution of sulphur dioxide added. Analysis of the resulting solution by polarography and by spectrophotometric determination of the radical ion formed on reduction with sodium dithionite at pH 9 showed the presence of an amount of the bipyridylium ion corresponding to a reaction efficiency of 84.0% based on the pyridinium salt fed.

EXAMPLE 9

The procedure of Example 8 was repeated, except that only a catalystic amount ($5 \times 10^{-4}$ m.—0.025 g.) of sodium cyanide was used. The solution produced was found to contain the bipyridylium ion in an amount corresponding to a reaction efficiency of 25% based on the pyridinium salt fed.

EXAMPLE 10

To a solution of sodium cyanide (0.045 g.) in dimethylformamide at 150° C. was added N-methylpyridine-4-carboxylate (1.354 g.) and the solution was heated under nitrogen for 4 hours at 150° C. The solution was cooled and an aqueous solution of sulphur dioxide added. The resulting solution was found by spectrophotometric analysis to contain the N,N'-dimethyl bipyridylium in an amount corresponding to a reaction efficiency of 74.0% based on the pyridinium salt fed.

What is claimed is:

1. A process for the manufacture of a 1,1'-disubstituted-4,4'-bipyridylium salt wherein the 1,1'-substituents are alkyl groups of 1 to 6 carbon atoms or carbamoylalkyl groups of the formula —$R_1$—CO—$NR_2R_3$ wherein $R_1$ is the methylene radical, $R_2$ and $R_3$ are alkyl groups of 1 to 6 carbon atoms and $R_2$ and $R_3$ may, together with the attached nitrogen atom, make up a morpholino or piperidino ring which comprises reacting in a polar aprotic solvent at temperatures from 25° C. to 120° C. at least 0.1 mole per litre of the corresponding N-substituted pyridinium salt selected from the group consisting of N-substituted pyridinium salts having in the 4-position a —COOH group and salts thereof, with cyanide ions under basic conditions to form a 1,1'-disubstituted-1,1'-dihydro-4,4'-bipyridyl and subsequently oxidizing the dihydrobipyridyl by means of an oxidizing agent which is an electron acceptor and which has a redox potential in water more positive than —0.50 volt as compared with saturated calomel electrode to form the 1,1'-disubstituted-4,4'-biypridylium salt.

2. A process as claimed in claim 1 wherein the reaction is carried out in the presence of an added base.

3. A process as claimed in claim 1 wherein the reaction is carried out at a temperature of from 40° C. to 90° C.

4. A process as claimed in claim 1 wherein the cyanide ions are added in the form of an alkali metal cyanide.

5. A process as claimed in claim 1 wherein the oxidizing agent is selected from oxygen and air.

6. A process as claimed in claim 1 wherein the oxidizing agent is an inorganic oxyacid anhydride.

7. A process as claimed in claim 1 wherein oxidation is carried out at a pH of from 4 to 6.

8. A process as claimed in claim 1 wherein the N-substituent of the pyridinium salt is the methyl group.

9. A process as claimed in claim 1 wherein the N-substituent of the pyridinium salt is a carbamoylmethyl group.

10. A process as claimed in claim 1 wherein the interaction product of the reaction mixture is isolated prior to oxidation.

11. A process as claimed in claim 10 wherein water or an organic acid is added to the interaction product to precipitate the product from solution.

12. A process as claimed in claim 10 wherein the interaction product is isolated by solvent extraction.

13. A process as claimed in claim 1 wherein the heterocyclic ring of the carbamoylalkyl group is selected from piperidine and morpholine rings.

14. A process as claimed in claim 1 wherein the concentration of the N-substituted pyridinium salt is from 0.1 to 2 moles per litre.

References Cited

UNITED STATES PATENTS

| | | | |
|---|---|---|---|
| 3,336,325 | 8/1967 | Downes et al. | 260—296 D |
| 3,405,135 | 10/1968 | Colchester et al. | 260—296 D |

HENRY R. JILES, Primary Examiner

R. T. BOND, Assistant Examiner

U.S. Cl. X.R.

260—296 D, 293.69, 293.65, 295 Q